Sept. 16, 1947.  B. H. HADLEY  2,427,453
VEHICLE BACK-UP WARNING DEVICE
Filed Oct. 27, 1944
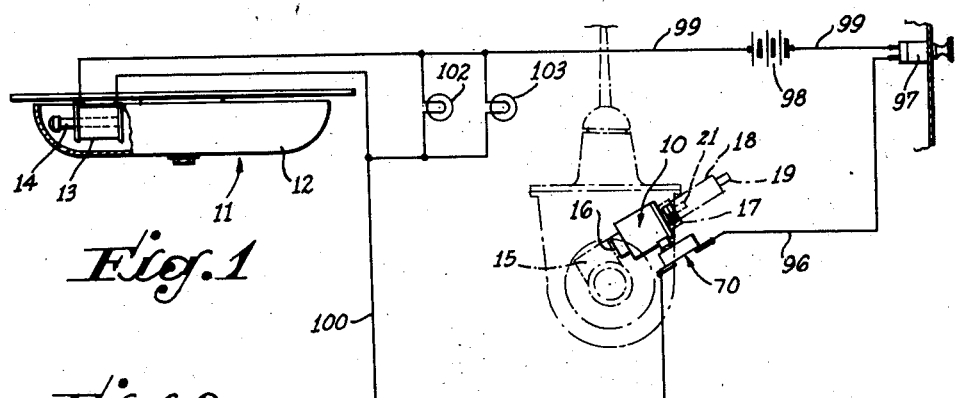
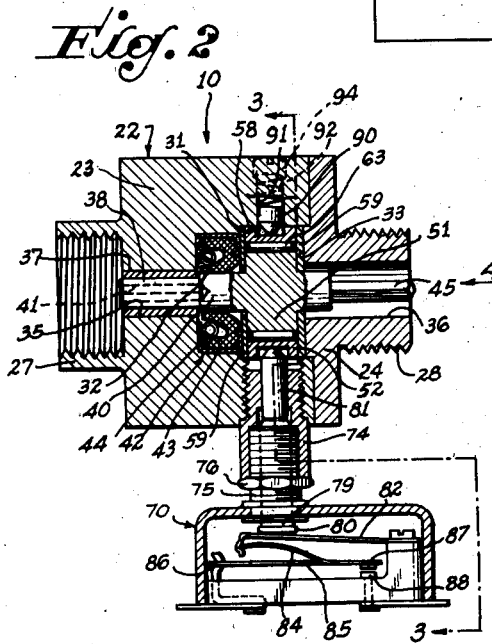
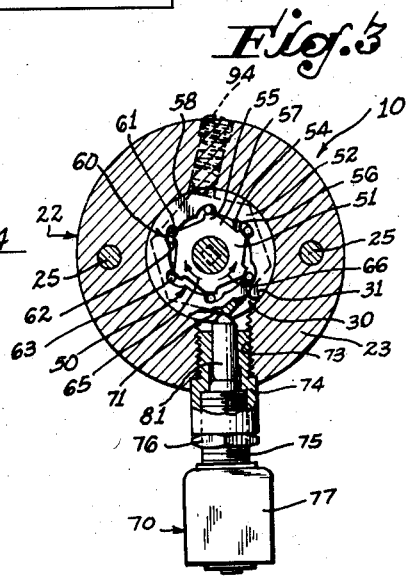
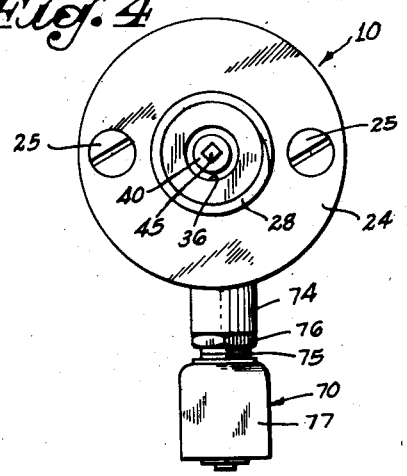
INVENTOR
BENJAMIN H. HADLEY
BY
HARRIS, KIECH, FOSTER & HARRIS
FOR THE FIRM
ATTORNEYS Patented Sept. 16, 1947

2,427,453

UNITED STATES PATENT OFFICE 2,427,453

VEHICLE BACKUP WARNING DEVICE

Benjamin H. Hadley, Pomona, Calif.

Application October 27, 1944, Serial No. 560,682

7 Claims. (Cl. 200—52)

1

My invention relates to back-up warning devices for vehicles and, more particularly, to a device for producing signals, audible or visible, to warn persons in the path of a rearwardly moving automotive vehicle.

The need for an adequate foolproof safety device of this nature is increasingly recognized, particularly in the trucking field where the driver's view of the rearward path of movement of the truck is impeded. Many injuries to persons have resulted from the absence of, or improper functioning of, such back-up warning devices.

It is an object of the present invention to provide a simple, foolproof, and long-lived warning system of this type.

A further object is to provide a novel attachment for existing vehicles and which is capable of providing adequate warnings to persons in the path of rearward movement of a vehicle.

Still another object of the invention is to provide a simple and sturdy switch means for intermittently energizing a warning circuit in response to rotation of a drive member in a single direction; also, to provide a novel switch means in which the frequency of energization of the warning circuit is proportional to the rate of rearward movement of a vehicle, thus giving a signal indicative of the degree of impending danger; also, to provide a system permitting adjustment of the duration of the signal impulses employed for energizing the warning device.

Still a further object of the invention is to provide a novel circuit arrangement including a signal lamp indicating the operation of the system and, in some instances, indicating a dead-center position of the cam-actuated switch.

Further objects and advantages of the invention will be evident to those skilled in the art from the following description of an exemplary embodiment.

Referring to the drawing:

Figure 1 is a wiring diagram of the invention;

Figure 2 is a vertical sectional view of the cam-driven switch of the invention;

Figure 3 is a vertical sectional view, taken along the line 3—3 of Figure 2; and Figure 4 is an end view, taken as indicated by the arrow 4 of Figure 2.

In general, the invention involves a novel intermittent switch 10 intermittently energizing a warning device 11 during rearward movement of a truck or other vehicle, this energization being through a warning circuit, to be later described. The warning device 11 is preferably positioned near the rear of the vehicle and is shown as

2 comprising an electrically actuated gong or bell 12, preferably of the type giving one loud warning note each time the warning circuit is energized by the intermittent switch 10. In Figure 1, such a bell is shown diagrammatically as including a solenoid winding 13 connected in the warning circuit and acting, when energized, to move a hammer or plunger 14 into percussive contact with the inner surface of the bell.

The intermittent switch 10 is preferably connected to some operating part of the vehicle which turns oppositely upon forward and rearward movement of the vehicle. The particular embodiment to be illustrated is designed to be driven by a conventional speedometer drive connection, and it is preferred to place the intermittent switch 10 at some position along the drive means for the vehicle speedometer. Usually, such a speedometer drive connection extends from the transmission or drive shaft of the vehicle, an exemplary drive connection being indicated diagrammatically by the dotted lines 15 of Figure 1, and being shown as providing an externally-threaded neck 16 conventionally, and in the absence of the invention, receiving a coupling 17 of a flexible housing 18 in which a flexible actuating cable 19 extends to the speedometer. A squared drive pin, not shown, extends within the neck 16 to fit into a coupling 21 at the lower end of the cable, the pin being turned in a forward direction when the vehicle is moving forwardly and being turned in a rearward direction when the vehicle is moving rearwardly. The intermittent switch 10 of the invention, as illustrated, is adapted to be interposed in the speedometer drive adjacent the drive connection 15.

Referring particularly to Figure 2, the intermittent switch 10 includes a clutch housing 22 comprising a base member 23 and a cover member 24 removably connected, as by countersunk screws 25. The base member 23 provides an internally-threaded collar 27, to be threadedly connected to the neck 16. The cover member 24 provides an externally-threaded neck 28 to receive the coupling 17.

As best shown in Figures 2 and 3, the base member 23 provides a counterbored chamber 30, shown as bounded by a cylindrical wall 31, by a radial wall 32, and by a face 33 of a circular offset or boss of the cover member 24, which fits the cylindrical wall 31 to center the cover member. The base member 23 and the cover member 24 respectively provide openings 35 and 36 aligned on an axis traversing the chamber 30. The opening 35 receives a sleeve bearing 37 which journals a reduced-diameter portion 38 of a shaft 40 traversing the chamber. The forward end of this shaft provides a squared opening 41 to receive the squared oppositely-rotatable drive pin of the speedometer drive connection 16 to turn the shaft 40 in a forward direction when the vehicle is moving forwardly and in a reverse direction when the vehicle is moving rearwardly. Disposed in the counterbore of the chamber 30 is a suitable grease seal 42. This grease seal functions to prevent movement of transmission lubricant into the chamber 30. The preferred type of seal includes an annular sealing member 43 substantially U-shaped in cross section and providing a coiled spring or other annular resilient member 44 pressing the inner portion of the sealing member against the periphery of the shaft 40 with only sufficient pressure to maintain an effective seal. The rear end of the shaft 40 provides a squared pin 45 adapted to engage with the coupling 21 at the lower end of the flexible actuating cable when the coupling 17 is attached to the neck 28. Thus, the device does not interfere with the normal operation of the vehicle speedometer.

Disposed in the chamber 30 is an overrunning clutch, indicated generally by the numeral 50. This overrunning clutch should be of a type giving a very free overrunning action when the vehicle is moving forwardly, but giving a positive operative connection when the vehicle is moved rearwardly even a short distance. The design shown in Figures 2 and 3 has been found particularly well suited to the invention.

In general, the overrunning clutch 50 provides a first or inner clutch member 51, a second or outer clutch member 52, and means for operatively associating these clutch members when the vehicle is moved rearwardly, while operatively disconnecting the clutch members when the vehicle moves forwardly. The first or inner clutch member 51 is formed integrally with, or operatively connected to, the shaft 40 to turn therewith in either direction. The circular periphery of this inner clutch member 51 provides notches 54 to provide peripherally-spaced teeth or projections 55. Each notch is bounded by a rather steep outwardly-extending wall 56 and a relatively flat wall 57 extending to the top of the next tooth or projection.

The second or outer clutch member 52 is designed to turn freely in the chamber 30. It provides a peripheral surface 58 only slightly smaller in diameter than the cylindrical wall 31 to move in sliding contact therewith. Free journalling is also insured by thin washers 59 on opposite sides of the outer clutch member and spaced a sufficient distance that no binding of this clutch member will result. This outer clutch member 52 provides an outwardly-notched central opening several thousandths of an inch larger than the outer periphery of the inner clutch member 51. The outwardly-extending notches are best shown in Figure 3 and are indicated by the numeral 60, each being bounded by a rather steep wall 61 and a sloping less-steep wall 62. A pinlike roller 63 is positioned in each of the notches 60.

The operation of this overrunning clutch means is as follows. When the inner clutch member 51 turns clockwise, as indicated by the arrow 65 and corresponding to forward movement of the vehicle, a slight movement of this member from its position shown in Figure 3 will permit those rollers in the upper half of the structure to drop into the notches 54. However, continued clockwise movement will merely cause these rollers to be forced again upward by the relatively flat wall 57 so that no clockwise rotation is imparted to the outer clutch member 52. During such clockwise rotation of the inner clutch member, the rollers above the center line merely rise and fall, with no turning moment being imparted to the outer clutch member, thus insuring that the warning device will not be actuated and thus forming no impediment to the normal speedometer drive. However, upon small counter-clockwise movement from the position shown in Figure 3, as indicated by the arrow 66 and as corresponds with rearward movement of the vehicle, the rollers above the horizontal center line will roll down the faces 57 into the notches 54. Continued counter-clockwise movement will cause the outwardly-extending wall 56 to displace its contacting roller against the sloping wall 62 of its notch 60 of the outer clutch member 52 and continued movement will positively drive the outer clutch member in a counter-clockwise direction.

Operatively associated with the second or outer clutch member 52 is a cam means for intermittently actuating a switch, indicated generally by the numeral 70. This cam means is shown as comprising a plurality of cam surfaces 71 formed on the periphery of the outer clutch member 52. While these cam surfaces can be made to extend throughout the axial dimension of the outer clutch member, the preferred method of forming the cam means is to cut the cam surfaces in a central zone of the peripheral surface 58, thereby leaving the side portions of this peripheral surface for journalling the outer clutch member. As shown, six cam surfaces 71 are thus formed so that the cam is, in effect, a six-lobed hexagonal structure.

A threaded opening 73 communicates with the chamber 30 and receives the threaded male end of a fitting 74. The other end of this fitting is internally threaded to receive a sleeve 75 which can be locked in position by a lock nut 76, this sleeve being connected to and supporting a switch housing 77. A follower means extends in contact with the cam means and serves to actuate the switch 70. This follower means is shown as comprising a switch plunger 79, limited in its outward movement by contact of its head 80 with the sleeve 75, and a floating follower 81 sliding in the fitting 74. The upper end of the follower 81 is rounded or tapered to engage the cam surfaces 71, and the lower end is in pressure-transmitting relationship with the switch plunger 79. This arrangement relieves the switch plunger from any sideward thrust as would be induced if the plunger 79 extended completely to the cam surfaces.

The internal construction of one type of switch 70 is best shown in Figure 2 as including a cantilever-mounted flexible arm 82 engaged by the head 80 of the plunger and moving the follower 81 resiliently into contact with the cam surfaces 71. The forward end of this arm is bent downwardly and shaped to provide a bearing groove for the forward end of a curved member 84 connected at its rear end to a contact arm 85 which is journalled at its forward end on a post 86. The switch includes contact means, shown as including a movable contact 87 and a stationary contact 88. A toggle-type switch is preferred to insure quick opening and closing of the contacts, with only a small fraction of an inch movement of the actuating plunger. No novelty is claimed per se for the specific toggle-type switch illustrated and it should be clear that any small-throw switch can be employed. It is preferred, also, that the switch provide some overthrow action whereby its contacts close before the follower 81 reaches a crest of the cam, the subsequent movement of this follower in moving to and over the crest being taken up by the overthrow action of the switch.

The intermittent switch shown in Figures 2 and 3 is designed to prevent stoppage of the outer clutch member 52 in a dead-center position at which the contacts 87 and 88 would remain closed to drain the battery of the energizing circuit. In accomplishing this, the threaded opening 73 is disposed slightly off-center so that its axis does not intersect the axis of the shaft 40. Stated in other words, the axis of the threaded opening 73 is tangential to a small circle drawn about the axis of the shaft 40. The flexible arm 82 of the switch forces the follower 81 resiliently into contact with the cam surfaces and exerts a force on the outer clutch member 52 when in the position shown in Figure 3, this force tending to turn the clutch member as indicated by the arrow 66. This minor force, aided by vehicle vibration and by the ability of the outer clutch member to turn freely, rotates this clutch member until the tip of the follower 81 is substantially at the mid position of the cam surface, thus insuring opening of the contacts 87 and 88. If desired, a supplementary force tending to turn the outer clutch member 52 in this manner can be supplied by an auxiliary follower 90 disposed in a non-radial bore 91 and urged resiliently into contact with the cam surfaces by a spring 92 compressed between the auxiliary follower and a screw closure 94. In the preferred arrangement, such auxiliary means exerts a turning force on the cam means even when the follower 81 is at or near a dead-center position, thus aiding in insuring that the outer clutch member 52 will not stop in a dead-center switch-closing position.

The preferred circuit is shown in Figure 1. As there suggested, the contact 88 is connected by conductor 96 to a system-control switch 97 conveniently mounted on the dashboard of the vehicle. The other side of this switch is connected in series with a battery 98 by conductor 99 which extends to one terminal of the solenoid winding 13 and which forms a part of the warning circuit. A conductor 100, also forming a part of the warning circuit, connects the other side of the solenoid winding 13 to the contact 87 through the arm 85 and the post 86. Correspondingly, if the switch 97 is closed and the vehicle is backed up, the follower means will be reciprocated to close intermittently the contacts of the switch 70. The bell 12 will emit a loud warning note upon each energization and the frequency with which this note is repeated will be proportional to the rearward speed of the vehicle.

In some instances it is desirable to employ, either alternatively or in addition to the audible warning device, a visual warning means. For example, Figure 1 shows two lamps 102 and 103 connected between conductors 99 and 100 to be illuminated each time the intermittent switch is closed, thus giving a flashing signal. One or both of these lamps can be disposed at the rear of the vehicle. In some instances, one of the lamps may be disposed within view of the operator to indicate the periodic energization of the warning circuit, thus showing proper operation thereof or any improper functioning of the means for preventing stoppage of the outer clutch member 52 on dead-center switch-closing position arising from excessive wear or from any source preventing free rotation of this outer clutch member. Should such a signal lamp remain lighted when the vehicle is moved forwardly, the circuit can be deenergized by opening the switch 97 or merely by stopping and backing the vehicle slightly until the dead-center condition is corrected.

In some instances the warning device may be of a nature giving a continuous indication throughout the time that the contacts 87 and 88 are closed. This is true, for example, as regards the lamps 102 ad 103; also, if a doorbell-type or make-and-break type of bell is employed as the warning device. In such event, the length of the energizing periods, as compared with the length of the intervening periods of non-energization, can be adjusted merely by loosening the lock nut 76 and screwing the switch sleeve 75 different distances into the fitting 74. In this way, the upper end of the follower 81 can be made to engage only the crests of the cams or the overthrow motion of the switch can be extended or shortened to vary the length of the energizing periods.

Various changes and modifications can be made in the exemplary embodiment without departing from the spirit of the invention as defined in the appended claims.

I claim as my invention:

1. An intermittent switch adapted to be driven in forward and reverse directions, said switch including in combination: a housing providing a chamber; an outer clutch member freely rotatable in said chamber and including peripherally disposed cam surfaces; an inner clutch member rotatable in said forward and reverse directions; roller means interconnecting said clutch members to drive said outer clutch member only when said inner clutch member is moving in said reverse direction; contact means; and means actuated by said cam surfaces for intermittently closing said contact means.

2. A combination as defined in claim 1, in which said outer clutch member provides an outwardly-notched central opening, in which said inner clutch member turns, and in which said inner clutch member provides a notched periphery, said roller means comprising a plurality of pins respectively disposed in the notches of said outer clutch member.

3. An intermittent switch including in combination: a housing providing a chamber bounded by a cylindrical wall; a cam member rotatable in said chamber and providing a cylindrical peripheral surface only slightly smaller than said cylindrical wall and journalled therein; cam surfaces carried by said cam member near its periphery; a shaft rotatable in forward and reverse directions in said chamber; an overrunning clutch means operatively driving said cam member from said shaft when said shaft is rotated in said rearward direction; a pair of contacts; and follower means engaging said cam surface for intermittently closing said contacts.

4. A combination as defined in claim 3, in which said cam surfaces are indented into said cylindrical peripheral surface of said cam member.

5. An intermittent switch including in combination: a housing providing a chamber; a member rotatable about an axis in said chamber and providing cam surfaces on its periphery, said cam surfaces cooperating in providing lobes; a pair of switch contacts; and means for operatively connecting said switch contacts to said cam to close said contacts intermittently and for preventing stoppage of said member in contact-closing position, said means including a follower operatively connected to said contacts, means for urging said follower resiliently into contact with said cam surfaces, and means for guiding said follower to move along an axis displaced from the axis of rotation of said member.

6. An intermittent switch including in combination: a housing providing a chamber; a cam member rotatable in said chamber and providing cam surfaces around its periphery; a shaft rotatable in forward and reverse directions in said chamber; an overrunning clutch means operatively driving said cam member from said shaft when said shaft is rotated in said reverse direction; a pair of contacts; follower means engaging said cam surfaces for intermittently closing said contacts; and means for preventing stoppage of said cam member on a dead-center position in which said contacts are closed.

7. An electric switch adapted to be connected in the speedometer drive means of a vehicle to energize a back-up warning circuit intermittently, said switch including: a clutch housing providing an opening; an overrunning clutch means within said clutch housing and comprising a first rotatable clutch member adapted to be driven respectively in forward and reverse directions, a second rotatable clutch member adjacent said first clutch member, and means for operatively associating said clutch members when said first clutch member is turning in said reverse direction to drive said second clutch member and for operatively disassociating said clutch members to prevent turning of said second clutch member when said first clutch member is turning in said forward direction; cam means driven by said second clutch member; an assembled switch unit including a switch housing, a follower means extending from said switch housing, contact means in said switch housing, and mechanical means operatively associated with said contact means and driven by said follower means to open and close said contact means in step with reciprocation of said follower means; and means for detachably connecting said switch unit to said clutch housing with said follower means extending through said opening of said clutch housing in operative relation with said cam means, said means for detachably connecting said switch unit to said clutch housing including means for adjusting the relative positions of said clutch and switch housings to adjust the distance said follower means extends into said opening.

BENJAMIN H. HADLEY.

REFERENCES CITED

The following references are of record in the file of this patent:

UNITED STATES PATENTS

| Number | Name | Date |
|---|---|---|
| 1,466,012 | Bowlus | Aug. 28, 1923 |
| 1,655,787 | Harris | Jan. 10, 1928 |
| 2,086,800 | Harris | June 13, 1937 |
| 2,132,188 | Rockett et al. | Oct. 4, 1938 |
| 2,143,550 | Gilbert | Jan. 10, 1939 |
| 2,399,033 | Hudson | Apr. 23, 1946 |